No. 693,171. Patented Feb. 11, 1902.
J. P. SNEDDON.
APPARATUS FOR FORMING HOLLOW OR TUBULAR ARTICLES OF IRREGULAR SHAPE.
(Application filed Apr. 12, 1901.)
(No Model.) 2 Sheets—Sheet 1.
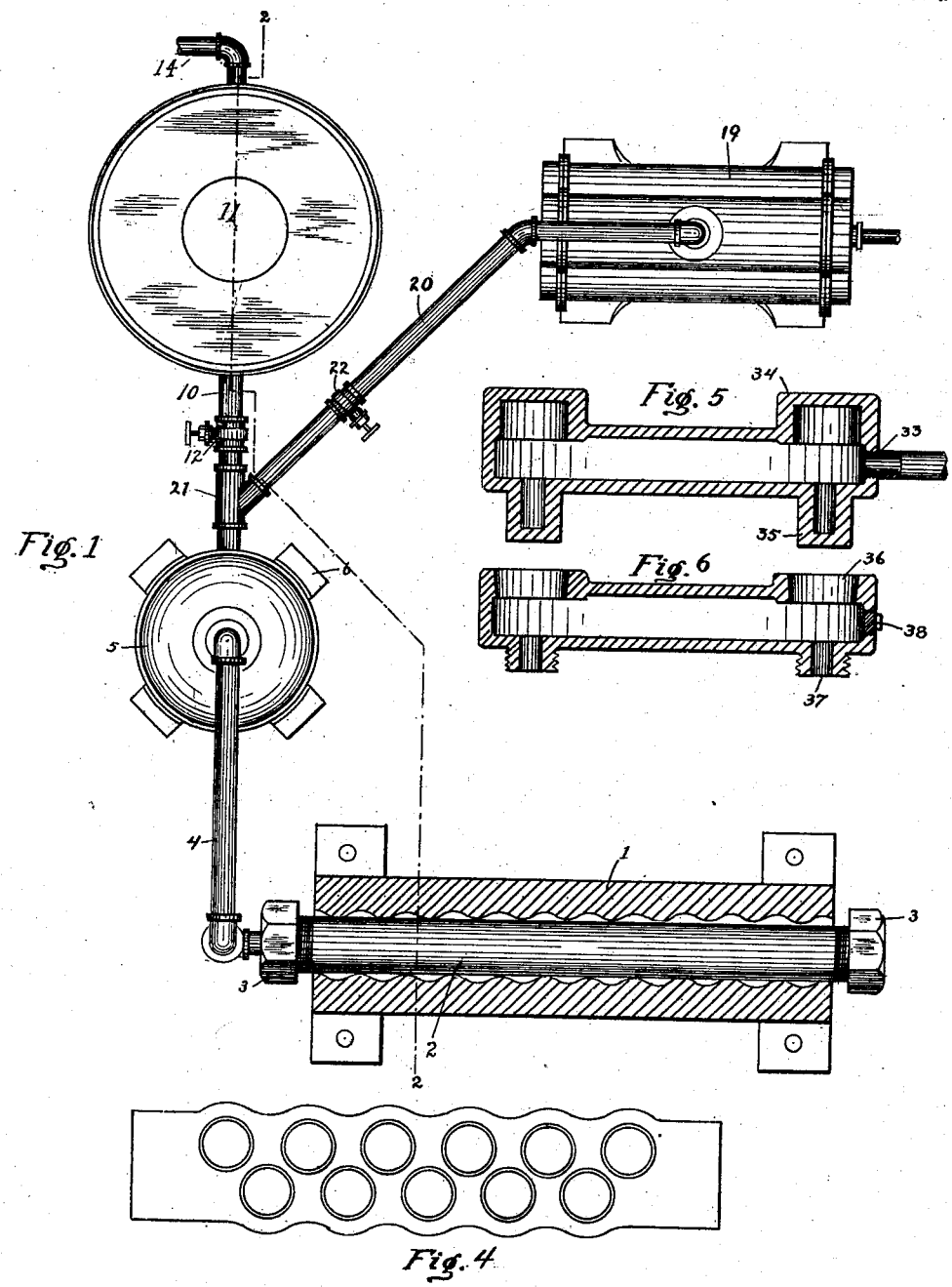

No. 693,171. Patented Feb. 11, 1902.
J. P. SNEDDON.
APPARATUS FOR FORMING HOLLOW OR TUBULAR ARTICLES OF IRREGULAR SHAPE.
(Application filed Apr. 12, 1901.)
(No Model.) 2 Sheets—Sheet 2.
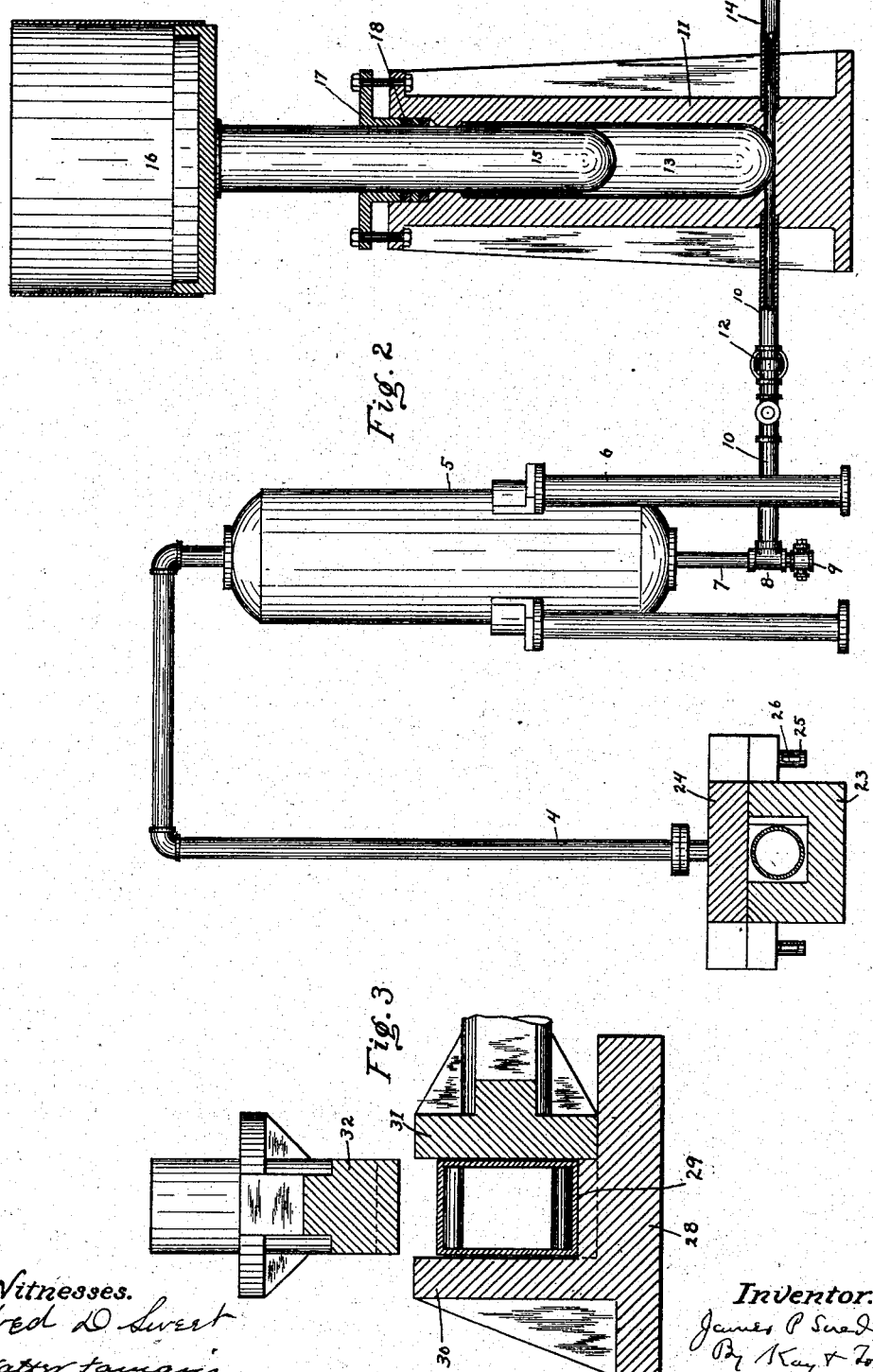

UNITED STATES PATENT OFFICE.

JAMES P. SNEDDON, OF BARBERTON, OHIO, ASSIGNOR, BY MESNE ASSIGNMENTS, TO THE STIRLING COMPANY, OF JERSEY CITY, NEW JERSEY, A CORPORATION OF NEW JERSEY.

APPARATUS FOR FORMING HOLLOW OR TUBULAR ARTICLES OF IRREGULAR SHAPE.

SPECIFICATION forming part of Letters Patent No. 693,171, dated February 11, 1902.

Application filed April 12, 1901. Serial No. 55,539. (No model.)

*To all whom it may concern:*

Be it known that I, JAMES P. SNEDDON, a resident of Barberton, in the county of Summit and State of Ohio, have invented a new and useful Improvement in Apparatus for Forming Hollow or Tubular Articles of Irregular Shape; and I do hereby declare the following to be a full, clear, and exact description thereof.

My invention relates to apparatus for forming hollow or tubular metal articles of irregular outline—such, for instance, as serpentine boiler-headers, bottom blow-off connections for boilers, or other articles.

Serpentine boiler-headers and similar articles are made from comparatively heavy metal, and as such articles are irregular in shape considerable difficulty has been experienced in forming such articles of wrought-iron or steel. By reason of the thickness of the metal composing such articles it requires heavy pressure to properly shape the same, and in order to prevent the collapsing of the tube during the shaping process it is necessary to use an internal support or mandrel for the same. By reason of the great irregularity in the shape of these articles difficulty has been experienced in providing a suitable internal support or mandrel which will offer sufficient resistance to the action of the external forging or pressing dies and which, nevertheless, is capable of being withdrawn or removed from the header or other article after the same is shaped. Heretofore serpentine headers and similar articles have been made of wrought metal only by the use of complicated sectional mandrels, which were inserted in the tube and thereafter withdrawn.

The object of my invention is to overcome these objections in the formation of articles of this character and to provide apparatus for shaping such articles wherein the necessity of the said complicated internal supports or mandrels is done away with.

To this end my invention comprises suitable dies, either movable or immovable, in which is inclosed the blank, either tubular or, if necessary, given a preliminary shaping approximating the shape of the finished article, said blank being either cold or heated, as found desirable, and using in conjunction with such dies suitable means for introducing air at a high pressure into the interior of the tubular blank and thereafter subjecting said air to further compression by means of a suitable hydraulic-pressure mechanism.

In the accompanying drawings, Figure 1 is a plan view of the apparatus, the die being shown in section. Fig. 2 is a vertical section on the line 2 2, Fig. 1. Fig. 3 is a vertical transverse sectional view of modified forms of dies for inclosing the tubular blank. Fig. 4 is a side view of a shaped serpentine boiler-header. Fig. 5 is a sectional view illustrating the formation of a bottom blow-off connection for boilers, and Fig. 6 is a sectional view of the finished bottom blow-off connection.

In the drawings, 1 represents the dies for inclosing or incasing the tubular blank 2, said blank having its ends suitably closed, as by the cap-nuts 3 3, and one end being connected by the pipe 4 to the upper end of the receiving-tank 5, which is mounted upon the supports 6. To the lower end of said tank 5 is connected a pipe 7, which is provided with the coupling 8 and with an ordinary valve or cock 9 at its lower end. To the coupling 8 is secured a pipe 10, which leads to the hydraulic accumulator 11, and said pipe is provided with a cut-off valve 12. The accumulator 11 is of the ordinary form and is provided with the chamber 13, with the lower end of which the pipe 10 communicates and which chamber is supplied with suitable water-pressure through the pipe 14, which is connected to suitable hydraulic pumps. (Not shown.) In the chamber 13 works the plunger 15, which is suitably weighted, as at 16, at its upper end, said plunger working water-tight through the upper end of the cylinder 13, a suitable gland 17 and packing 18 being provided for that purpose. The accumulator is of a type very commonly used and further details of description are not necessary.

19 represents an air-compressor of any suitable type, which is connected by the pipe 20 to a coupling 21 in the pipe 10, although said pipe 20 may lead directly to the receiving-tank 5, if desired. In the pipe 20 a suitable cut-off valve 22 is provided. The dies 1 comprise the stationary lower die 23 and the removable upper die 24, suitable means, such as the pins 25 and keys 26, being provided for holding the upper die 24 firmly in place. The interior faces of these dies are so shaped as to give the desired form to the article to be made.

In the practice of my invention the tubular blank 2, which is shown as circular, but may be given a preliminary shape approximating its final shape, if desired, is placed in the dies 1, either in the cold state or first having been raised to a proper temperature, and the dies 1 are firmly closed, so as to incase or inclose the tubular blank. Compressed air from the compressor 19 is then admitted to the interior of the tube up to a pressure of from one hundred to two thousand pounds per square inch, as the case may be, depending upon the thickness of the metal forming the tubular blank. When the tube is filled with air at the desired pressure, the valve 22 in the pipe 20, leading from the compressor, is closed and the valve 12 in the accumulator-main 10 is opened. The water-pressure in the accumulator further compresses the air in the receiving-tank 5 and in the tubular blank in the dies 1 to such pressure as may be required to force the metal of the tubular blank out against the walls of the dies to conform to the shape of the latter. The water from the accumulator 11 by reason of its greater specific gravity will not rise above the air in the receiving-tank 5, but will force the air upward and into the tubular blank and will compress the air to a pressure equal to that in the accumulator. The direct pressure of the air is of course limited by the clearance-spaces in the compressor, and, furthermore, air is a highly-compressible body, so that by means of the same it is not possible to secure sufficient pressure to force a tubular blank having thick walls out against the walls of the inclosing dies; but water being an incompressible body, by means of the accumulator a very high pressure can be secured, which pressure is communicated to the air in the tubular blank and will force the walls of the same out against the inclosing dies. By reason of the fact that articles made of heavy metal must be heated before they are shaped it is not desirable to introduce the water directly into the heated tubular blank in the dies, for the reason that the water would chill the said blank so rapidly that it would prevent the proper shaping of the same. Air, on the contrary, has a very low heat-absorbing capacity, and consequently it will not seriously reduce the heat of the blank in the dies. It will therefore be observed that by first filling the heated blank with the compressed air and maintaining a sufficient quantity or reservoir of air in the receiving-tank to prevent the water entering the tubular blank and then compressing this air by means of hydraulic pressure I am enabled to secure in the tubular blank an unyielding pressure equal to the pressure in the accumulator, but in such a manner that the heat of the blank is not reduced thereby. It is therefore necessary in the particular apparatus shown that the pipe 4 should lead from the upper end of the receiving-tank 5, and it is also necessary that the accumulator be connected to the lower end of said tank, so as to provide a large quantity or reservoir of air between the water column and the compressed air in the tubular blank, in order that the water may not rise high enough to enter said pipe 4. While I have shown the air-compressor as connected to the coupling 21 in the accumulator-main 10, this is not necessary, as the air-pressure may be introduced directly into the tank 5 and at any point therein, it not being necessary to introduce it into the lower end of the tank, as shown. After the blank is suitably compressed, the valve 12 is closed and the valve 9 opened to allow the water and compressed air to escape. The finished blank will then be removed from the dies and another blank put in place therein, with its ends suitably closed and coupled to the pipe 4, when the operation will be repeated.

In some cases it may be found desirable to make the inclosing dies movable, and such arrangement is shown in Fig. 3, wherein 28 represents a stationary die having the sinuous horizontal face 29 and plain vertical face 30, and 31 represents a movable plain-faced side die, and 32 a movable sinuous-faced top die. The dies 31 and 32 may be moved by ordinary hydraulic cylinders, (not shown,) and in the use of such dies the blank is inclosed loosely in the same, and after the tubular blank is filled with compressed air the movable dies may be moved up closer to the blank and compress the same to some extent, and these dies may be given slight inward and outward movements during the time that the pressure is applied to the interior of the blank in order to properly forge and shape the article.

The dies in Figs. 1, 2, and 3 are adapted to form the serpentine boiler-header shown in Fig. 4, said header, as is well known, having plain side faces, which are substantially parallel to each other, and the opposing two faces being sinuous or serpentine in shape.

In order to form the bottom blow-off connection for boilers, (shown in Fig. 6,) a tube having its ends first closed by welding and given a preliminary shape and heated, if desired, is incased in dies of suitable shape and has the pipe 4 inserted in a screw-threaded opening 33 in the end thereof. Pressure is then admitted, as before described, and forces out the swells or protuberances 34 and 35, and after the blank is removed from the dies the ends of these swells or protuberances are cut off to form the connecting-openings 36 37, (shown in Fig. 6,) and the opening 33 is closed by a screw-plug.

The method described herein is not claimed in this application, but is claimed in an application of even date herewith, Serial No. 55,540.

What I claim, and desire to secure by Letters Patent, is—

1. In apparatus for shaping hollow metal articles, the combination with suitable dies for inclosing a hollow blank, of means for introducing air under pressure into said blank, and other means for thereafter further compressing said air by hydraulic pressure.

2. In apparatus for shaping hollow metal articles, the combination with suitable dies for inclosing a hollow blank, of a source of compressed air and controllable connections from the same to the interior of the blank, a source of hydraulic pressure and controllable connections from the same to the air connections, said connections having a considerable capacity between the tubular blank and the accumulator.

3. In apparatus for shaping hollow metal articles, the combination with suitable dies for inclosing a hollow blank, of a reservoir, connections from the same to the hollow blank, an air-compressor and a hydraulic accumulator, suitable connections from the same to the reservoir, and cut-off valves in said connections.

4. In apparatus for shaping hollow metal articles, the combination with suitable dies for inclosing a hollow blank, of a reservoir, connections from the top of the same to the interior of said blank, an air-compressor, connections from the same to the receiving-tank, a hydraulic accumulator, connections from the same to the bottom of the receiving-tank, and suitable cut-off valves in the connections from the air compressor and accumulator to the reservoir.

5. In apparatus for shaping hollow metal articles, the combination with suitable dies for inclosing a hollow blank, said dies comprising a stationary part and one or more movable parts, of a source of compressed air and controllable connections from the same to the interior of the blank, a source of hydraulic pressure and controllable connections between the same and a body of compressed air in the tubular blank.

In testimony whereof I, the said JAMES P. SNEDDON, have hereunto set my hand.

JAS. P. SNEDDON.

Witnesses:
O. D. EVERHARD,
E. E. BAKER.